United States Patent Office 3,297,575
Patented Jan. 10, 1967

3,297,575
NOVEL TRINUCLEAR PHENOLS AND COMPOSITIONS STABILIZED THEREWITH
Calvin J. Worrel, Detroit, Mich., assignor to Ethyl Corporation, New York, N.Y., a corporation of Virginia
No Drawing. Filed June 27, 1961, Ser. No. 119,798
18 Claims. (Cl. 252—52)

This invention deals with a novel class of compounds, their preparation and their use as antioxidants. More particularly, it relates to a novel and unusual class of substituted phenolic compounds, their preparation and the embodiment of these compounds as stabilizers and antioxidants for organic material.

Phenolic compounds have found utility as antioxidants in various organic media. In general, they have been found to have a high degree of specificity. Thus while certain compounds could be used to advantage in one medium, as a general rule when used in other media their effectiveness falls off and they may even act as pro-oxidants. Applicants, however, have discovered a certain type of phenolic compound which, contrary to the properties of phenolic compounds in general, is an effective antioxidant in a large and varied range of organic media. Applicants do not know why this is. At best an analogy can only be drawn between the antioxidant field and the catalyst field where such phenomena are often observed.

It is, therefore, an object of this invention to provide a novel class of chemical compounds. A further object is to provide a method of preparing these novel compounds. Another object is to provide novel compositions of matter comprising organic material stabilized against oxidative deterioration. A specific object is to provide polymeric material stabilized against oxidative deterioration. Another specific object is to provide lubricating oil stabilized against oxidative deterioration. Other objects will become apparent from the following description of the invention.

The above and other objects are accomplished by provision of a compound having the formula (I)

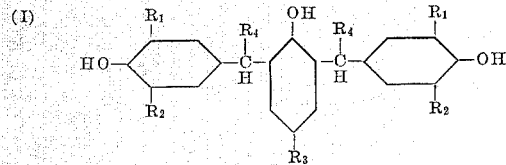

wherein $R_1$, $R_2$ and $R_3$ are each independently selected from the group consisting of alkyl of from 1–12 carbon atoms, aralkyl of from 7–12 carbon atoms and cycloalkyl of from 5–12 carbon atoms, and $R_4$ is selected from the group consisting of hydrogen, alkyl radicals of from 1–12 carbon atoms and mono-nuclear aryl radicals of from 6–12 carbon atoms. Examples of the compounds of this invention include:

$\alpha^2,\alpha^6$-bis(3,5-di-tert-butyl-4-hydroxyphenyl)-mesitol;
$\alpha^2,\alpha^6$-bis(3,5-diisopropyl-4-hydroxyphenyl)-mesitol;
$\alpha^2,\alpha^6$-bis(3,5-diisopropyl-4-hydroxyphenyl)-4-tert-octyl-2,6-xylenol;
$\alpha^2,\alpha^6$-bis(3-n-decyl-4-hydroxy-5-n-octylphenyl)-$\alpha^2,\alpha^6$-dimethyl-4-n-propyl-2,6-xylenol;
$\alpha^2,\alpha^6$-bis(3-p-ethylcyclohexyl-5-cyclopentyl-4-hydroxyphenyl)-$\alpha^2,\alpha^6$-di-n-dodecyl-4-n-octyl-2,6-xylenol;
$\alpha^2,\alpha^6$-bis(3,5-dibenzyl-4-hydroxyphenyl)-$\alpha^2,\alpha^6$-di-sec-butyl-4-n-heptyl-2,6-xylenol;
$\alpha^2,\alpha^6$-bis[3-($\alpha$-ethylbenzyl)-5-($\alpha,\alpha$-diethylbenzyl)-4-hydroxyphenyl]-$\alpha^2,\alpha^6$-diphenyl-4-n-heptyl-2,6-xylenol;
$\alpha^2,\alpha^6$-bis(3,5-dicyclohexyl-4-hydroxyphenyl)-$\alpha^2,\alpha^6$-di-n-octyl-4-n-dodecyl-2,6-xylenol;
$\alpha^2,\alpha^6$-bis[3-p-n-propylcyclohexyl-5-($\alpha$-n-propylbenzyl)-4-hydroxyphenyl]-$\alpha^2,\alpha^6$-di-p-n-hexylphenyl-4-cyclopentyl-2,6-xylenol; and
$\alpha^2,\alpha^6$-bis(3-ethylcyclopentyl-5-n-heptyl-4-hydroxyphenyl)-$\alpha^2,\alpha^6$-di-p-n-propylphenyl-4-p-n-amylcyclohexyl-2,6-xylenol.

The pure compounds of this invention are generally water and acid insoluble, white to amber crystalline solids. They are ashless, non-corrosive, substantially non-volatile and hydrolytically stable, facilitating incorporation into a wide range of organic material.

A preferred embodiment of this invention consists of compounds of Formula I wherein $R_4$ is hydrogen. These compounds are preferred because of their ease of preparation from readily available starting materials and their better stability. Among the compounds represented by this preferred embodiment are:

$\alpha^2,\alpha^6$-bis(3-benzyl-5-p-ethylcyclohexyl-4-hydroxyphenyl)-4-tert-octyl-2,6-xylenol;
$\alpha^2,\alpha^6$-bis[3-p-n-propylcyclohexyl-5-($\alpha$-n-propylbenzyl)-4-hydroxyphenyl]-4-cyclopentyl-2,6-xylenol;
$\alpha^2,\alpha^6$-bis(3,5-dicyclopentyl-4-hydroxyphenyl)-4-cyclohexyl-2,6-xylenol;
$\alpha^2,\alpha^6$-bis(3-p-n-amylbenzyl-5-o-methylcyclohexyl-4-hydroxyphenyl)-4-p-n-amylbenzyl-2,6-xylenol;
$\alpha^2,\alpha^6$-bis[3-($\alpha$-methylbenzyl)-5-($\alpha$-ethyl-$\alpha$-methylbenzyl)-4-hydroxyphenyl]mesitol;
$\alpha^2,\alpha^6$-bis(3,5-di-n-dodecyl-4-hydroxyphenyl)-4-tert-butyl-2,6-xylenol;
$\alpha^2,\alpha^6$-bis(3,5-di-tert-butyl-4-hydroxyphenyl)-4-n-nonyl-2,6-xylenol; and
$\alpha^2,\alpha^6$-bis(3,5-di-tert-butyl-4-hydroxyphenyl)-4-tert-octyl-2,6-xylenol.

A particularly preferred embodiment of this invention consists of compounds of Formula I wherein $R_4$ is hydrogen, $R_3$ is an alkyl group of from 1–8 carbon atoms, and $R_1$ and $R_2$ are each independently selected alpha-branched alkyl groups of from 3–12 carbon atoms. These are particularly preferred because of their ease of preparation and their excellent antioxidant properties. Among the compounds represented by this embodiment are:

$\alpha^2,\alpha^6$-bis(3,5-di-tert-butyl-4-hydroxyphenyl)mesitol;
$\alpha^2,\alpha^6$-bis(3-tert-butyl-4-hydroxy-m-tolyl)mesitol;
$\alpha^2,\alpha^6$-bis(3,5-diisopropyl-4-hydroxyphenyl)mesitol;
$\alpha^2,\alpha^6$-bis(3,5-di-tert-butyl-4-hydroxyphenyl)-4-tert-octyl-2,6-xylenol;
$\alpha^2,\alpha^6$-bis(3-tert-butyl-4-hydroxy-m-tolyl)-4-tert-octyl-2,6-xylenol;
$\alpha^2,\alpha^6$-bis(3,5-diisopropyl-4-hydroxyphenyl)-4-tert-octyl-2,6-xylenol;
$\alpha^2,\alpha^6$-bis(3-sec-butyl-5-n-hexyl-4-hydroxyphenyl)-4-ethyl-2,6-xylenol; and
$\alpha^2,\alpha^6$-bis(3,5-di-n-dodecyl-4-hydroxyphenyl)-4-tert-butyl-2,6-xylenol.

The most particularly preferred compounds of this invention consist of compounds of the above formula wherein $R_4$ is hydrogen, $R_3$ is selected from the group consisting of methyl and tert-octyl radicals, $R_2$ is a tert-butyl radical and $R_1$ is selected from the group consisting of methyl and tert-butyl radicals. These compounds are the most particularly preferred because they have been found to have excellent antioxidant properties and are the most readily prepared by the methods described in this application. They are superior antioxidants in polymeric material, lubricating oil and other organic media. Examples of these compounds are:

$\alpha^2,\alpha^6$-bis(3,5-di-tert-butyl-4-hydroxyphenyl)mesitol;
$\alpha^2,\alpha^6$-bis(3-tert-butyl-4-hydroxy-m-tolyl)mesitol;

α²,α⁶-bis(3,5-di-tert-butyl-4-hydroxyphenyl)-4-tert-octyl-2,6-xylenol and

α²,α⁶-bis(3-tert-butyl-4-hydroxy-m-tolyl)-4-tert-octyl-2,6-xylenol.

The compounds of this invention can be produced by the reaction of a benzyl halide having the formula (II)

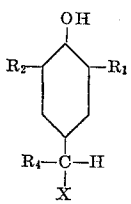

wherein R₁, R₂ and R₄ are as in Formula I and X is halogen with a para-substituted phenol having the formula (III)

wherein R₃ is as in Formula I.

The conditions of the reaction are variable. Thus, the compounds can be produced by a simple reaction of a compound of Formula II with a compound of Formula III with or without a solvent.

Further, the reaction may be conducted with or without a catalyst. It has been found, however, that the presence of a Lewis acid catalyst, such as the protonic and Friedel-Crafts catalysts generally enchance the reaction giving rise to higher yields with less reaction time. In general, when using Friedel-Crafts catalysts the milder catalysts such as $ZnCl_2$, $MgCl_2$ and $SnCl_4$ are preferred to the stronger catalysts such as $AlCl_3$. These stronger catalysts will aid the reaction but under certain conditions may result in impurities due to partial dealkylation of some of the starting material.

The temperatures employed are likewise not critical. The reaction may be conducted at temperatures up to about 200° C. and preferably in the range of about 50 to about 100° C. The reaction proceeds at temperatures well below room temperature. Thus this invention contemplates reaction temperatures of 0° C. or less.

To obtain the elevated temperatures sometimes desired in the reactions, elevated pressure may be resorted to. However, with most of the reactants atmospheric pressure is sufficient.

Reaction times of from a few minutes to one week or more can be employed. It is found that reaction times of from a few minutes to about 24 hours are sufficient for good yields.

The solvents used in the process of this invention may be aromatics such as benzene, toluene, xylene and mesitylene; saturated hydrocarbons such as pentane, hexane, isooctane, dodecane, hexadecane, nonadecane and their isomers; ethers such as ethyl ether and propyl ether; esters such as methyl acetate, propyl acetate, ethyl propionate, amyl acetate and methyl butyrate; organic acids such as acetic acid, propionic acid, butyric acid, valeric acid, dodecanoic acid, lauric acid and stearic acid; and dioxane. These solvents may be chlorinated. Sulfur-containing solvents such as carbon disulphide are also useful.

While the reaction can be run in contact with air it may be desirable to blanket the reaction with nitrogen. This helps to avoid the formation of color bodies and other impurities. In conducting the reaction, the ratio of benzyl halide to para substituted phenol is not critical. Thus the compounds contemplated by this invention can be produced when either of the reactants is in the presence of a substantial amount of the other reactant. However, it is obvious that to achieve maximum economies it is desirable to use a stoichiometric ratio of reactants. Thus it is desirable to use substantially two equivalents of the benzyl halide to one equivalent of the para-substituted phenol.

Various means may be used to separate the product from the reaction mixture. For example, the product can be precipitated and obtained by filtration or distillation and evaporation techniques can be used to isolate the product.

The following examples illustrate the compounds of this invention and their preparation according to the method outlined above.

*Example 1*

In a reaction vessel equipped with heating means, stirring means and temperature measuring means were placed 130 parts by weight of 2,6-di-tert-butyl-4-hydroxybenzyl chloride and 27 parts by weight of p-cresol. The mixture was stirred for 24 hours at 95° C. Reduced pressure was then applied to remove evolving HCl gas. The residue was taken up in benzene and washed with water. The benzene layer was separated and stripped under reduced pressure to 130° C. at 0.3 mm. to yield, as the residue, amber colored α²,α⁶-bis(3,5-di-tert-butyl-4-hydroxyphenyl)mesitol. This compound melts at 138.0° C. An infrared spectrum showed no evidence of the starting material and supported the 1, 2, 3, 5 substitution on the benzene ring. It revealed an hydroxyl band at 2.73μ and another at 2.83μ.

Good results are also obtained when other para-substituted phenols are reacted with other benzyl halides in the manner of Example 1. For example, substantially two equivalents of 3-n-decyl - 4-hydroxy - 5-n-octyl-α-methylbenzyl bromide can be reacted with one equivalent of p-n-propylphenol to produce α²,α⁶-bis(3-n-decyl - 4-hydroxy - 5-n-octylphenyl)-α²,α⁶-dimethyl - 4-n-propyl - 2,6-xylenol. Also 3,5-dicyclohexyl-4-hydroxy-α-n-octylbenzyl iodide can be reacted with p-n-dodecylphenol to produce α²,α⁶-bis(3,5-dicylohexyl - 4-hydroxyphenyl) - α²,α⁶-di-n-octyl - 4-n-dodecyl - 2,6-xylenol. Likewise, 3-benzyl - 5-p-ethylcyclohexyl-4-hydroxybenzyl floride can be reacted with p-tert-octylphenol to produce α²,α⁶-bis(3-benzyl-5-p-ethylcyclohexyl-4-hydroxyphenyl)-4-tert-octyl-2,6-xylenol.

*Example 2*

In a reaction vessel equipped with heating and cooling means, stirring means and temperature measuring means were placed 168 parts by weight of 3,5-di-tert-butyl-4-hydroxybenzyl chloride. To this was added incrementally over one half hour 70 parts by weight of isooctane containing 27 parts by weight of p-cresol and 1.1 parts by weight of $SnCl_4$. The reaction temperature during the addition was maintained at 25° C. The reaction mixture was then maintained at 25° C. for 2½ hours. The mixture was filtered; the precipitate was washed with isooctane and dried to yield α²,α⁶-bis(3,5-di-tert-butyl-4-hydroxyphenyl)mesitol, melting at 138.0° C.

Good results are likewise obtained when other benzyl halides are reacted with other para-substituted phenols in the manner of Example 2. For example, 3-tert-butyl-4-hydroxy-5-methylbenzyl chloride can be reacted with p-tert-octylphenol in carbon disulphide with $ZnCl_2$ as a catalyst to yield α²,α⁶-bis (3-tert-butyl-4-hydroxy-m-toly) - 4-tert-octyl - 2,6-xylenol. Also, 3-(α-ethylbenzyl)-5-(α,α-diethylbenzyl) - 4-hydroxy-α-phenylbenzyl bromide can be reacted with p-n-heptylphenol in tetrachloroethane with $MgCl_2$ as a catalyst to yield α²,α⁶-bis [3-(α-ethylbenzyl) - 5-(α,α-diethylbenzyl) - 4-hydroxyphenyl]-α²,α⁶-diphenyl - 4-n-heptyl - 2,6-xylenol. Likewise, 3-p-n-butylcyclohexyl - 5-p-n-heptylcyclopentyl - 4-hydroxybenzyl bromide can be reacted with p-(p-n-hexylcyclohexyl)phenol in chlorobenzene with $AlCl_3$ as a catalyst to produce α²,α⁶-bis(3-p-n-butyl-cyclohexyl-5-p-n-heptylcyclopentyl-4-hydroxyphenyl) - 4-p-n-hexylcyclohexyl-2,6-xylenol.

Example 3

In a reaction vessel equipped with heating means, stirring means, temperature measuring means, gas outlet and inlet tubes and a nitrogen source were mixed 130 parts by weight of 3,5-di-tert-butyl-4-hydroxybenzyl chloride, 54.5 parts by weight of p-tert-octylphenol and 3.4 parts by weight of $ZnCl_2$. The reaction vessel was flushed with nitrogen, heated to 60° C. and maintained at that temperature for 3.5 hours. The nitrogen was then vented and the mixture was acidified with acetic acid, dissolved in benzene and washed with water. The benzene layer was separated and upon evaporation of the benzene and other volatile materials, $\alpha^2,\alpha^6$-bis(3,5-di-tert-butyl-4-hydroxyphenyl)-4-tert-octyl-2,6-xylenol was obtained. An infrared spectrum revealed three hydroxyl bands; one at $2.73\mu$, a shoulder band at $2.78\mu$ and another band at $2.83\mu$. No evidence of the starting material was found. The spectrum also supported the 1,2,3,5 substitution on the benzene ring.

Following the above procedure good results are also obtained when 3,5-diisopropyl-4-hydroxybenzyl chloride is reacted with p-cresol in the presence of a catalytic amount of $MgCl_2$ to produce $\alpha^2,\alpha^6$-bis(3,5-diisopropyl-4-hydroxyphenyl)mesitol. Likewise, 3,5-di-tert-butyl-4-hydroxybenezyl bromide can be similarly reacted with p-n-nonylphenol in the presence of a catalytic amount of HCl to yield $\alpha^2,\alpha^6$-bis(3,5-di-tert-butyl-4-hydroxyphenyl)-4-n-nonyl-2,6-xylenol. Also 3,5-di-n-dodecyl-4-hydroxybenzyl chloride can be reacted with p-tert-butylphenol in the presence of a catalytic amount of $SnCl_4$ to yield $\alpha^2,\alpha^6$-bis(3,5-di-n-dodecyl - 4-hydroxyphenyl) - 4-tert-butyl - 2,6-xylenol.

Example 4

To a reaction vessel equipped with heating and cooling means, stirring means and temperature measuring means containing 254 parts by weight of 3-tert-butyl-4-hydroxy-5-methylbenzyl chloride were added a mixture of 175 parts by weight of isooctane, 2 parts by weight of $SnCl_4$ and 40.5 parts by weight of p-cresol. The reaction mixture was stirred overnight at room temperature (about 20° C.) for about 17 hours. The mixture was then washed with water, dried over anhydrous calcium sulphate and filtered. The solvent was stripped under reduced pressure to yield $\alpha^2,\alpha^6$-bis(3-tert-butyl-4-hydroxy-m-tolyl)mesitol. This compound melts at 136° C. Infrared analysis supported the configuration.

Good results are also obtained by following the above procedure when 3,5-diisopropyl-4-hydroxybenzyl chloride is reacted in toluene with p-tert-octylphenol in the presence of a catalytic amount of $ZnCl_2$ to yield $\alpha^2,\alpha^6$-bis(3,5-diisopropyl - 4-hydroxyphenyl) - 4-tert-octyl - 2,6-xylenol. Likewise, 3-sec-butyl-5-n-hexyl-4-hydroxy-benzyl chloride can be reacted in ethylene dichloride with p-ethylphenol and a catalytic amount of $MgCl_2$ to yield $\alpha^2,\alpha^6$-bis(3-sec-butyl-5-n-hexyl - 4-hydroxyphenyl) - 4-ethyl-2,6-xylenol. Also 3,5-dicyclopentyl-4-hydroxybenzyl chloride can be reacted in glacial acetic acid with p-cyclohexylphenol and a catalytic amount of $AlCl_3$ to yield $\alpha^2,\alpha^6$-bis(3,5-dicyclopentyl-4-hydroxyphenyl)-4-cyclohexyl-2,6-xylenol.

Example 5

In a reaction vessel equipped with heating means, stirring means, and temperature measuring means are placed 77.4 parts by weight of 3-($\alpha$-methylbenzyl)-5-($\alpha$-ethyl-$\alpha$-methylbenzyl)-4-hydroxybenzyl chloride and 110 parts by weight of p-cresol. The mixture is heated to 200° C. and stirred at that temperature for 2 minutes. The mixture is then taken up in hexane and washed with water. The hexane layer is separated and stripped under reduced pressure to yield $\alpha^2,\alpha^6$-bis[3-($\alpha$-methylbenzyl)-5-$\alpha$-ethyl-$\alpha$-methylbenzyl)-4-hydroxyphenyl]-mesitol.

Good results are also obtained when 3,5-dibenzyl-4-hydroxy-$\alpha$-di-sec-butylbenzyl bromide is reacted with p-n-heptylphenol to yield $\alpha^2,\alpha^6$-bis(3,5-dibenzyl-4-hydroxyphenyl-$\alpha^2,\alpha^6$-di-sec-butyl - 4-n-heptyl - 2,6-xylenol. Likewise, 3-p-n-propylcyclohexyl-5-($\alpha$-n-propylbenzyl)-$\alpha$-p-n-hexylbenzyl chloride can be reacted with p-cyclopentyl- to yield $\alpha^2,\alpha^6$-bis[3-p-n-propylcyclohexyl-5-($\alpha$-n-propylbenzyl) - 4-hydroxyphenyl] - $\alpha^2,\alpha^6$-di-p-n-hexylbenzyl - 4-cyclopentyl-2,6-xylenol.

Example 6

In a reaction vessel equipped with heating and cooling means, stirring means and temperature measuring means are placed 485 parts by weight of 3-p-ethylcyclohexyl-5-cyclopentyl - 4 - hydroxy-$\alpha$-n-dodecylbenzyl chloride, 103 parts by weight of p-n-octylphenol and 2.0 parts by weight of $SnCl_4$ in 1,000 parts by weight of toluene. The reaction mixture is cooled to 0° C. and maintained at that temperature with stirring for one week. The mixture is then filtered. The precipitate is washed with toluene and dried to yield $\alpha^2,\alpha^6$-bis(3-p-ethylcyclohexyl-5-cyclopentyl-4 - hydroxyphenyl) - $\alpha^2,\alpha^6$-di-n-dodecyl-4-n-octyl-2,6-xylenol.

Good results are also obtained when 3-p-n-amylbenzyl-5-o-methylcyclohexyl-4-hydroxybenzyl chloride is reacted with p-n-amylphenol and a catalytic amount of $MgCl_2$ in benzene to yield $\alpha^2,\alpha^6$-bis(3-p-n-amylbenzyl-5-o-methylcyclohexyl-4-hydroxyphenyl)-4-p-n-amyl - 2,6 - xylenol. Likewise 3-p-ethylcyclopentyl-5-n-heptyl-4-hydroxy-$\alpha$-p-n-proplyphenylbenzyl chloride can be reacted with p-n-amylcyclohexylphenol in dioxane with a catalytic amount of $ZnCl_2$ to yield $\alpha^2,\alpha^6$-bis(3-p-ethylcyclopentyl-5-n-heptyl-4-hydroxyphenyl)-$\alpha^2,\alpha^6$-di-p-n-propylphenyl - 4 - p-n-amylcylohexyl-2,6-xylenol.

Example 7

In a reaction vessel equipped with heating means, stirring means and temperature measuring means are placed 24.0 parts by weight of 3-tert-butyl-4-hydroxy-5-isopropylbenzyl chloride and 5.4 parts by weight of p-cresol in 100 parts by weight of dipropyl ether. The mixture is heated to 50° C. and maintained at that temperature for 8 hours. The mixture is then washed with water, dried over anhydrous calcium sulphate and filtered. The solvent is stripped under reduced pressure to yield $\alpha^2,\alpha^6$-bis(3-tert-butyl-4-hydroxy-5-isopropylphenyl)mesitol.

Further good results are obtained when 3-ethyl-4-hydroxy-5-isopropylbenzyl chloride is reacted with p-ethylphenol in sec-butyl acetate to yield $\alpha^2,\alpha^6$-bis(3-ethyl-4-hydroxy - 5 - isopropylphenyl)-4-ethyl-2,6-xylenol. Likewise, 3,5-di-n-decyl-4-hydroxybenzyl chloride can be reacted with p-tert-butylphenol in hexane to yield $\alpha^2,\alpha^6$-bis-(3,5-di-n-decyl-4-hydroxyphenyl) - 4 - tert-butyl-2,6-xylenol.

Example 8

In a reaction vessel equipped with heating means, stirring means and temperature measuring means, gas outlet and inlet tubes and a nitrogen source are mixed 452 parts by weight of 3-tert-butyl-5-ethyl-4-hydroxybenzyl chloride and 135 parts by weight of p-n-propylphenol. The reaction vessel is flushed with nitrogen, heated to 100° C. and maintained at that temperature for 48 hours. The nitrogen is then vented and the mixture is acidified with acetic acid, dissolved in toluene and extracted with water. The toluene layer is separated and evaporated to yield $\alpha^2,\alpha^6$-bis(3-tert-butyl-5-ethyl-4-hydroxyphenyl)-4-n-propyl-2,6-xylenol.

Following the above procedure good results are also obtained when 3,5-di-n-propyl-4-hydroxybenzyl bromide is reacted with p-cresol to produce $\alpha^2,\alpha^6$-bis(3,5-di-n-propyl-4-hydroxyphenyl)-mesitol. Likewise 3-n-amyl-4-hydroxy-5-n-nonylbenzyl chloride can be similarly reacted with p-tert-amylphenol to yield $\alpha^2,\alpha^6$-bis(3-n-amyl-4-hydroxy-5-n-nonylphenyl) - 4-p-tert-amyl-2,6-xylenol. Also 3-p-tert-butylcyclohexyl - 5 - p-sec-butylcyclopentyl-4-hydroxybenzyl bromide can be reacted with p-n-hexylphenol to yield $\alpha^2,\alpha^6$-bis(3-p-tert-butylcyclohexyl-5-p-sec-butylcyclopentyl-4-hydroxyphenyl)-4-p-n-hexyl-2,6-xylenol.

The compounds of Formula II can be prepared by reacting a compound having the formula:

(IV)

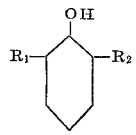

wherein $R_1$ and $R_2$ are as described in Formula I with an aldehyde having the formula:

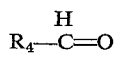

wherein $R_4$ is as described in Formula I, in the presence of, and reacting with, hydrogen chloride. Thus the following procedure can be used to produce 3,5-di-tert-butyl-4-hydroxybenzyl chloride.

In a reaction vessel equipped with a stirrer, and a sintered dispersion tube was placed 500 parts by weight of 35 percent hydrochloric acid, 120 parts by weight of p-formaldehyde and 206 parts by weight of 2,6-di-tert-butylphenol. Anhydrous hydrogen chloride gas was passed through the mixture by means of the dispersion tube for 7 hours. After standing at room temperature for about 15 hours the hydrogen chloride gas addition was continued for 2 hours. The mixture was separated into an organic phase and a water phase. Ether and benzene were added to the organic portion which was washed first with water, then with 2 percent sodium bicarbonate, again with water and then dried over sodium sulphate. After filtering, the solvents were distilled off under reduced pressure to give 245 parts (96.5 percent) of red viscous 3,5-di-tert-butyl-4-hydroxybenzyl chloride. Theoretical calculation for: $C_{15}H_{23}OCl$ is: 70.8 percent carbon, 9.1 percent hydrogen and 13.92 percent chlorine. Analysis: Found: 71.3 percent carbon, 9.3 percent hydrogen and 13.8 percent chlorine.

Illustrations of the preparation of other compounds of Formula II can be found in application Serial No. 53,363 filed September 1, 1960 now Patent No. 3,257,321, the inventor being Joseph D. Odenweller.

The compounds of this invention are outstanding antioxidants. Therefore, an embodiment of this invention is a new composition of matter which comprises organic material normally tending to undergo oxidative deterioration in the presence of air, oxygen or ozone, containing an appropriate quantity, from 0.001 up to about 5 percent, and preferably from about 0.25 to about 2 percent, of a compound having the Formula I above.

The compounds of this invention find important utility as antioxidants in a wide variety of oxygen sensitive materials. Thus, liquid hydrocarbon fuels such as gasoline, kerosene and fuel oil are found to possess increased storage stability by the use of an antioxidant of this invention. Likewise, liquid hydrocarbon fuels such as gasoline which contain organometallic additives such as tetraethyllead, as well as other organometallic compounds which are used as fuel additives, attain appreciably increased oxidative stability by the practice of this invention. In addition, lubricating oils and functional fluids, both those derived from naturally occurring hydrocarbons and those synthetically prepared, are greatly enhanced by the practice of this invention. The addition of small quantities of the compounds of this invention to such materials as turbine, hydraulic, transformer and other highly refined industrial oils, waxes, soaps and greases, plastics, synthetic polymers such as polyethylene and polypropylene, organometallic compositions such as tetraethyllead and tetraethyllead antiknock fluids, elastomers (including natural rubber), crankcase lubricating oils, lubricating greases, and the like, greatly increase their resistance to deterioration in the presence of air, oxygen or ozone.

The compounds of this invention are also very effective antioxidants for high molecular weight unsaturated hydrocarbon polymers, such as polybutadiene, methyl rubber, polybutene rubber, natural rubber, butyl rubber, GR-S rubber, GR-N rubber, piperylene rubber, dimethyl butadiene rubber and the like.

As noted, the compounds of this invention are useful in preventing oxidative deterioration in lubricating oil compositions. Thus, a preferred embodiment of this invention is a lubricating oil normally susceptible to oxidative deterioration containing a small antioxidant quantity, up to 5 percent, of a compound of this invention as defined above.

To prepare the lubricants of this invention, an appropriate quantity—from about 0.001 to about 5 percent and preferably from about 0.25 to about 2 percent—of a compound of this invention is blended with the base oil to be protected. Suitable base oils include mineral oils and also synthetic diester oils, such as sebacates, adipates, etc. which find particular use as aircraft instrument oils, hydraulic and damping fluids and precision bearing lubricants. All of these base oils are normally susceptible to oxidative deterioration, especially at elevated temperature.

The finished lubricants of this invention have much greater oxidation stability and many other improved performance characteristics as compared with the corresponding base oils. The following examples illustrate the preferred lubricating oil compositions of this invention.

Example 9

To illustrate the outstanding advantages achieved by the practice of the preferred embodiments of this invention, particularly when the compositions are subjected to elevated temperature, experiments were conducted using the Panel Coker test. This test measures the oxidative stability of oils which are maintained at elevated temperatures in the presence of air, the oils periodically coming in contact with a hot metal surface. The test is described in the Aeronautical Standards of the Departments of Navy and Air Force, Spec. MIL-L-7808c dated November 2, 1955. In these tests an initially additive-free 95 V.I. solvent-refined SAE-10 crankcase oil was used. The Panel Coker apparatus was operated at 600° F. for 10 hours on a cycling schedule—the splasher being in operation for 5 seconds followed by a quiescent period of 55 seconds. On completion of these tests the extent by which the various test oils were decomposed under these high-temperature oxidizing conditions was determined by weighing the amount of deposit which formed on the metallic panel. The results are given in Table I.

TABLE I.—PANEL COKER DATA

| Additive | Concentration, Percent | Panel weight gain, mg. |
|---|---|---|
| None | | 434 |
| $\alpha^2,\alpha^6$-Bis(5-tert-butyl-4-hydroxy-m-tolyl) mesitol | 1 | 28 |
| $\alpha^2,\alpha^6$-Bis(3,5-di-tert-butyl-4-hydroxyphenyl) mesitol | 1 | 97 |

It can be seen from the above results that the compounds of this invention provide outstanding resistance to oxidative deterioration.

Example 10

To 1,000 parts of a solvent refined neutral oil (95 V.I. and 200 SUS at 100° F.) containing 6 percent of a commercial methacrylate Type V.I. approver which gives the finished formulation of a V.I. of 140 and a viscosity of 300 SUS at 100° F. is added 5 percent of $\alpha^2,\alpha^6$-bis(3,5-di-tert-butyl-4-hydroxyphenyl)-4-tert-octyl-2,6-xylenol.

Example 11

To an additive-free solvent refined crankcase lubricating oil having a viscosity index of 95 and an SAE viscosity of 10 is added 0.001 percent of $\alpha^2,\alpha^6$-bis(3-tert-butyl-4-hydroxy-m-tolyl)-4-tert-octyl-2,6-xylenol.

Example 12

To 100,000 parts of a petroleum hydrocarbon oil having a gravity of 30.3° API at 60° F., a viscosity of 178.8 SUS at 100° F., a viscosity index of 154.2 and which contains 0.2 percent sulfur, is added 200 parts of $\alpha^2,\alpha^6$-bis(3-benzyl-5-p-ethylhexyl - 4 - hydroxyphenyl) - 4 - tert-octyl-2,6-xylenol. The resulting oil possesses greatly enhanced resistance to oxidative deterioration.

Example 13

To 100,000 parts of a commercially available pentaerythritol ester having a viscosity at 100° F., of 22.4 centistokes, and known in the trade as "Hercoflex 600" is added 400 parts (0.4 percent) of $\alpha^2,\alpha^6$-bis(3-p-ethylcyclopentyl - 5 - n - heptyl - 4 - hydroxyphenyl)-$\alpha^2,\alpha^6$-di-p-n-propylphenyl -4 - p - n - amylcyclohexyl-2,6-xylenol. The resulting finished oil possesses markedly improved resistance against oxidative deterioration.

Example 14

To 100,000 parts of a dioctyl sebacate having a viscosity of 210° F., of 36.7 SUS, a viscosity index of 159 and a molecular weight of 426.7 is added 250 parts (0.25 percent of $\alpha^2,\alpha^6$-bis(3,5-dibenzyl - 4 - hydroxyphenyl)-$\alpha^2,\alpha^6$-di-sec-butyl-4-n-heptyl-2,6-xylenol.

The saturated hydrocarbon synthetic polymers which achieve greatly enhanced oxidative stability by the practice of this invention, include polymers obtained from the polymerization of a hydrocarbon monoolefin having up to 4 carbon atoms. Examples of such monomers are ethylene, propylene, butene-1, butene-2 and isobutylene. Thus the polymers are homopolymers and copolymers of ethylene, propylene, butene-1, butene-2 and isobutylene.

The concentration of the additive compounds in the polymers is from 0.001 up to 5 percent, and preferably from about 0.25 to about 2 percent.

Polyethylene is a hydrocarbon polymer derived from the polymerization of ethylene. This polymerization can be accomplished by a great variety of methods which lead to products of diverse properties. Polyethylene of any nature may advantageously be utilized for preparing compositions according to the present invention. The polymers of ethylene which are employed may, for example, be similar to those which may be obtained by polymerizing ethylene in a basic aqueous medium and in the presence of polymerization-favoring quantities of oxygen under relatively high pressures in excess of 500 or 1,000 atmospheres at temperatures between 150 and 275° C. Or, if desired, they may be similar or identical to the essentially linear and unbranched polymers ordinarily having greater molecular weights which may be obtained under relatively low pressures of 1 to 100 atmospheres using such catalysts to polymerize the ethylene as mixtures of strong reducing agents and compounds of Groups IVB, VB and VIB metals of the Periodic System; chromium oxide on silicated alumina; hexavalent molybdenum compounds; and charcoal supported nickel-cobalt.

The polyethylene which results from these various polymerization processes may have a molecular weight in the range from 1300 to over 1,000,000 depending on the particular conditions of polymerization employed.

The benefits derived from the practice of this invention are demonstrated by comparative oxidation tests of polyethylene. These tests are conducted as follows: The selected amount of antioxidant is blended with the polyethylene by milling a weighed quantity of plastic pellets on a warm roll-mill. The weighed quantity of antioxidant is added to the mill after the polyethylene has been premilled for a short period of time. The plastic containing the antioxidant is then added in weighed quantity to a standard size vessel and melted to give a surface of reproducible size. The vessel is then inserted into a chamber which can be sealed and which is connected to a capillary tube leading to a gas buret and leveling bulb. The apparatus is flushed with oxygen at room temperature, sealed, and the temperature is raised to 150° C. The oxygen pressure is maintained at 1 atmosphere by means of a leveling bulb. The oxygen uptake at the elevated temperature is recorded until a sharp increase in oxygen uptake occurs. This procedure has been adopted since it has been found that many compounds may inhibit the oxidation for a certain induction period after which time a very sharp increase in the rate of oxygen uptake occurs indicating that the antioxidant has been exhausted. In tests of this nature it is found that the compositions of this invention have greatly increased "induction periods." For example, polyethylene containing $\alpha^2,\alpha^6$-bis(3-tert-butyl-4-hydroxy-m-toly)mesitol was comparatively tested by the above procedure with polyethylene containing 4,4'-thiobis(6-tert-butyl-m-cresol), a commercial antioxidant sold under the trade name of "Santonox R." The polyethylene containing "Santonox R" was protected from oxidation for 80 hours, after which a rapid uptake of oxygen was noted. Polyethylene containing applicant's compound, $\alpha^2,\alpha^6$-bis(3-tert-butyl-4-hydroxy-m-tolyl)mesitol did not show a rapid oxygen uptake until 168 hours showing a two-fold improvement over a highly commercial polyethylene antioxidant.

There are several methods available for preparing the inhibited hydrocarbon polymer compositions of this invention. Thus, the blending of the antioxidant with a polymer such as, for example, polyethylene, may be carried out on open rolls, on internal mixers or may be accomplished by mixing with extrusion. It is also possible to prepare concentrated batches of the polymer containing excessive amounts of the antioxidant and then mix the concentrate with additional polymer to prepare a composition of this invention. The preferred method of compounding the polymers is by milling on heated open rolls at slightly elevated temperatures by methods well-known to the art. The temperature range employed is sometimes critical as certain polyethylenes will not melt at low temperatures and tend to stick to the rolls at high temperatures. The antioxidant may be initially mixed with the polymer in the dried state or it may be first dissolved in a suitable solvent, then sprayed on the polymer and milled in.

Examples of the hydrocarbon polymer compositions of this invention prepared as described above, follow. All parts and percentages are by weight in these examples.

Example 15

To 1000 parts of polyethylene produced by oxygen catalyzed reaction under a pressure of 20,000 atmospheres and having an average molecular weight of 40,000 is added and mixed 2 parts of $\alpha^2,\alpha^6$-bis(3,5-di-tert-butyl-4-hydroxyphenyl)-4-tert-octyl-2,6-xylenol. The resulting composition has greatly increased oxidative stability.

Example 16

With 200 parts of polyisobutylene having an average molecular weight of 100,000 is blended 1.0 part of $\alpha^2,\alpha^6$-bis(3-tert-butyl-4-hydroxy-m-tolyl) - 4 - tert - octyl - 2,6-xylenol.

Example 17

To a master batch of high molecular weight polyethylene having an average molecular weight of about 1,000,000, a tensile strength of 6,700 p.s.i., a Shore D hardness of 74 and a softening temperature under low load of 150° C. is added 5 percent of $\alpha^2,\alpha^6$-bis(3,5-diisopropyl-4-hydroxyphenyl)mesitol.

Example 18

A linear polyethylene having a high degree of crystallinity (about 93 percent) and below 1 ethyl branched chain per hundred carbon atoms, a density of about 0.96 gram per milliliter and which has about 1.5 double bonds per 100 carbon atoms is treated with $50 \times 10^{-6}$ roentgens of β-radiation. To the thus irradiated polymer is added 0.005 percent $\alpha^2,\alpha^6$-bis[3-p-n-propylcyclohexyl - 5-(α-n-propylbenzyl) - 4 - hydroxyphenyl] - $\alpha^2,\alpha^6$-di-p-n-amylbenzyl-4-cyclopentyl-2,6-xylenol, and the resulting product has better stability characteristics.

Example 19

To a polyethylene having an average molecular weight of 1500, a melting point of 88–90° C. and a specific gravity of 0.92 is added 1 percent of $\alpha^2,\alpha^6$-bis(3,5-diisopropyl-4-hydroxyphenyl)-4-tert-octyl-2,6 - xylenol. After milling in the antioxidant an extremely oxidation resistant product results.

Example 20

Two parts of $\alpha^2,\alpha^6$-bis(3,5-di-tert-butyl - 4 - hydroxyphenyl)-4-n-nonyl-2,6-xylenol are added with milling to 100 parts of a low density polyethylene prepared by high-pressure polymerization and which has an average molecular weight of about 20,000. The resulting product is vastly improved in its oxidative stability.

Example 21

To 10,000 parts of a polyethylene having an average molecular weight of about 100,000 and which has a tensile strength of 5400 p.s.i., a Shore D hardness of 70 and a softening temperature of 130° C. under low load is added ten parts of $\alpha^2,\alpha^6$-bis(3-sec-butyl-5-n-hexyl-4-hydroxyphenyl)-4-ethyl-2,6-xylenol to prepare a composition of outstanding oxidative stability.

Example 22

To the polyethylene in Example 17 is added 0.05 percent $\alpha^2,\alpha^6$-bis(3-n-decyl-4-hydroxy-5-n-octylphenyl)-$\alpha^2,\alpha^6$-dimethyl-4-n-propyl-2,6-xylenol. The resulting composition has improved antioxidant characteristics.

Example 23

To a polyisobutylene polymer having an average molecular weight of 35,000 is added sufficient 4,4'-bis(2,6-di-tert-butylphenol) to give a composition containing 0.03 percent of the antioxidant. The composition has improved antioxidant properties due to the presence of $\alpha^2,\alpha^6$-bis(3,5-di-n-dodecyl-4-hydroxyphenyl)-4-tert-butyl-2,6-xylenol.

Example 24

To a polypropylene having a specific gravity of 0.90, a tensile strength of 4300 p.s.i., a Rockwell hardness of 85 and a heat distortion temperature of 210° F. under a pressure of 66 p.s.i. is added 0.06 weight percent of $\alpha^2,\alpha^6$-bis(3,5-dicyclopentyl-4-hydroxyphenyl)-4-cyclohexyl-2,6-xylenol. The resulting polymer is stable against the deleterious effects of oxygen.

Example 25

To a polybutene, prepared from the polymerization of butene-1, and having an average molecular weight of 15,000, is added 0.15 weight percent of $\alpha^2,\alpha^6$-bis(3-p-n-amylbenzyl - 5 - o - methylcyclohexyl - 4 - hydroxyphenyl)-4-p-n-hexylphenyl-2,6-xylenol to give a polymer of outstanding oxidation stability.

Example 26

To a polybutene, prepared from the polymerization of butene-2, and having a molecular weight of 25,000 is added 0.10 weight percent of $\alpha^2,\alpha^6$-bis(3,5-dicyclohexyl-4 - hydroxyphenyl)-$\alpha^2,\alpha^6$ - di-n-octyl - 4 - n - dodecyl - 2,6 xylenol to yield a polymer with exceptional oxidative stability.

Example 27

To the polyisobutylene polymer of Example 23 is added 0.07 percent of $\alpha^2,\alpha^6$-bis[3-(α-ethylbenzyl)-5-(α,α-diethyl-benzyl) - 4 - hydroxyphenyl] - $\alpha^2,\alpha^6$ - diphenyl - 4 - n-heptyl-2,6-xylenol.

Example 28

To the polypropylene of Example 24 is added 0.02 percent of $\alpha^2,\alpha^6$-bis[3-(α-methylbenzyl)-5-(α-ethyl-α-methylbenzyl)-4-hydroxyphenyl]-mesitol.

Example 29

To the polybutene of Example 25 is added 0.03 percent of $\alpha^2,\alpha^6$ - bis(3 - p - ethylcyclohexyl - 5 - cyclopentyl - 4-hydroxyphenyl)$\alpha^2,\alpha^6$di-n-dodecyl-4-n-octyl-2,6-xylenol.

Example 30

To the polybutene of Example 26 is added 0.08 percent of $\alpha^2,\alpha^6$-bis(3-p-n-butylcyclohexyl-5-p-n-heptylcyclopentyl-4 - hydroxyphenyl) - 4 - p - n - hexylcyclohexyl - 2,6 - xylenol.

In addition to an antioxidant of this invention the saturated hydrocarbon polymers of this invention may contain other compounding and coloring additives including minor proportions of carbon black, elastomers, polyvinyl compounds, carboxylic acid esters, urea-aldehyde condensation products, flame retarding agents such as antimony trioxide and chlorinated hydrocarbons and various pigment compositions designed to impart color to the finished product.

The compounds of this invention are very useful in protecting petroleum wax—paraffin wax and micro-crystalline wax—against oxidative deterioration. They also find use in the stabilization of edible fats and oils of animal or vegetable origin which tend to become rancid especially during long periods of storage because of oxidative deterioration. Typical representatives of these edible fats and oils are linseed oil, cod liver oil, castor oil, soybean oil, rapeseed oil, coconut oil, olive oil, palm oil, corn oil, sesame oil, peanut oil, babassu oil, butter fat, lard, beef tallow and the like.

The compounds of this invention are also very useful in protecting vitamins against degradation, especially those vitamins which are incorporated in an oil base. Thus an embodiment of this invention is vitamins protected from degradation by incorporating said vitamins into an oil base containing a compound of this invention.

To demonstrate the effectiveness of the compounds of this invention in edible fats and oils the following test was conducted.

The Active Oxygen Method test was followed. This test involves the aeration of lard samples at 99° C. 80 grams of antioxidant-free lard is melted and .01 weight percent of the additive (dissolved in 5 ml. of ethyl alcohol) is added. Air is passed through the sample at 16 liters per hour while the temperature is maintained at 99° C. for 16 hours. After this time the peroxide number of the sample is determined. A low peroxide number indicates antioxidant protection. In tests of this nature it is found that lard is effectively protected by antioxidants of this invention. For example, an 80 gram sample of lard with no added antioxidant was tested according to this procedure and was found to have a peroxide number, after 16 hours, of 50. When, however, 0.01 weight percent of $\alpha^2,\alpha^6$ - bis(3,5 - di - tert - butyl - 4 - hydroxyphenyl)mesitol was added to an equal quantity of the same lard, the peroxide number, after 16 hours, was only 3.0.

The products of this invention are also useful as additives to functional fluids and automatic transmission fluids. The primary constituent of a functional fluid is a refined mineral lubricating oil having a carefully selected minimum viscosity of 49 Saybolt Universal seconds (SUS) at 210° F. and a maximum viscosity of 7,000 SUS at 0° F., generally a distillate oil, lighter than an SAE 10 motor oil. The oil usually amounts to between about 73.5 to about 97.5 percent by weight of the finished fluid. Preferably, the base oil is selected from a paraffin base distillate such as a Pennsylvania crude.

The fluids usually contain compounds which are characterized by containing one or more organic components which may be alkyl, aryl, alkaryl or aralkyl groups that are bonded to one or more metal atoms through coupling groups such as sulfonate, hydroxyl, carboxyl and mercaptan. The metal atoms may be aluminum, calcium, lithium, barium, strontium, and magnesium. The organic components contain oil solubilizing groups such as high molecular weight straight or branched chain paraffins, aromatic or naphthenic rings, or contain a halogen. These metal compounds are present in the compounded fluid in a concentration range of between about 0.1 to about 5 percent by weight. These compounds include alkaline-earth metal salts or phenyl-substituted long chain fatty acids, alkaline-earth metal salts of the capryl or octyl esters of salicylic acid, the alkaline-earth metal salts of petroleum sulfonic acids, the alkaline-earth metal salts of alkyl-substituted phenol sulfides, the salt of aluminum or the alkaline-earth metals with cetyl phenol, and the metal salts of wax-substituted phenol derivatives. Another class of additives are the so-called overbased phenates and sulfonates, which can be prepared by reaction between an alkyl phenol or alkyl phenol sulfide and an alkaline-earth metal oxide or hydroxide at an elevated temperature. The overbased phenate formed from the reaction contains up to two or three times as much metal as the normal phenate.

In addition, functional fluids may contain additional components which improve the properties of the fluid. Typical components include anti-squawk additives, pour point depressants, foam inhibitors, rust preventatives, extreme pressure agents, metal deactivators and viscosity index improvers.

The following examples show typical functional fluids of this invention. The fluids are formed by mixing the ingredients together, while heating the oil to a temperature up to 200° F.

*Example 31*

A fluid of this invention is prepared by blending 80 parts of a conventionally-refined Pennsylvania mineral oil (99 SUS at 100° F.), 2 parts of $\alpha^2,\alpha^6$-bis(3,5-di-tert-butyl-4-hydroxyphenyl)mesitol, 5 parts of barium petroleum sulfonate, 10 parts of a polyacrylate having a molecular weight of approximately 7,000 derived from a fatty alcohol such as cetyl or lauryl alcohol, 0.1 part of a dimethyl silicone polymer anti-foam agent, 2 parts of a dialkyl zinc dithiophosphate and 0.9 part of a dark, viscous liquid having a viscosity of 560 SUS at 210° F., a flash point of 420° F., a pour point of 30° F. and a specific gravity of 60/60° F. of 0.919.

*Example 32*

Another such fluid consists of 95 parts of a solvent refined, light acid-treated, clay-contacted, solvent dewaxed paraffin base distillate mineral oil (110 SUS at 100° F.); 0.1 part of $\alpha^2,\alpha^6$-bis(3-tert-butyl-4-hydroxy-m-tolyl)mesitol; 0.1 part of calcium octylphenol sulfide; 2 parts of a sulfurized sperm oil having a sulfur content between 10–12 percent, a viscosity of 210° F. of 200 SUS and a pour point of 65° F.; 0.3 part of an ester of an aromatic acid and wax-alkylated phenol having a molecular weight of approximately 450; 2.5 parts of a linear pale color isobutylene polymer of a controlled molecular weight having a viscosity of 3,000 SUS at 210° F., a specific gravity of 60/60° F. of 0.875.

Liquid hydrocarbon fuels employed in the operation of spark ignition combustion engines are also vastly improved in their storage stability by the practice of this invention. Table II, below, gives the compositions of a number of typical commercial gasolines which may be stabilized against oxidative deterioration by the inclusion therein of a product of this invention.

TABLE II.—GASOLINE COMPOSITIONS

| Gasoline | Percent Aromatics | Percent Olefins | Percent Saturates | Gravity, ° API |
|---|---|---|---|---|
| A | 26.6 | 20.8 | 52.6 | 62.1 |
| B | 8.6 | 7.9 | 83.5 | 68.5 |
| C | 20.0 | 41.2 | 38.8 | 62.9 |
| D | 20.5 | 32.9 | 46.6 | 63.5 |
| E | 38.1 | 7.3 | 54.6 | 59.3 |

*Example 33*

To 1,000 parts of Gasoline A, as described in Table II, is added 10 parts of $\alpha^2,\alpha^6$-bis(3,5-diisopropyl-4-hydroxyphenyl)mesitol.

*Example 34*

To 10,000 parts of Gasoline B is added 50 parts of $\alpha^2,\alpha^6$-bis(3,5-di-tert-butyl-4-hydroxyphenyl)-4-tert-octyl-2,6-xylenol.

*Example 35*

To 500 parts of Gasoline C, as described in Table II, is added 10 parts of $\alpha^2,\alpha^6$-bis(3-sec-butyl-5-n-hexyl-4-hydroxyphenyl)-4-ethyl-2,6-xylenol.

*Example 36*

To 2,000 parts of Gasoline D is added 15 parts of $\alpha^2,\alpha^6$-bis(3-tert-butyl-4-hydroxy-m-tolyl)-4-tert-octyl-2,6-xylenol.

*Example 37*

To 10,000 parts of Gasoline E is added 500 parts of $\alpha^2,\alpha^6$-bis(3,5-diisopropyl-4-hydroxyphenyl)-4-tert-octyl-2,6-xylenol.

Antiknock compositions and spark ignition internal combustion engine fuels containing mixtures or organolead antiknock agents and cyclopentadienyl manganese tricarbonyls are also vastly improved in their storage stability by the practice of this invention. Such compositions are described more fully in U.S. Patent No. 2,818,417.

In the compositions of this invention the concentrations of the prime ingredients will vary. Thus the finished fuels of this invention can contain from about 0.2 to about 6.4 grams of lead per gallon as an organolead antiknock agent. The manganese or nickel concentrations therein can range from about 0.005 to about 6 grams per gallon as a cyclopentadienyl manganese tricarbonyl or cyclopentadienyl nickel nitrosyl respectively. On a cost effectiveness basis, finished motor fuels containing per gallon from about 1 to about 4 grams of lead and from 0.05 to about 2 grams of manganese or nickel are preferred. In all of these finished fuels the concentration of the above compounds of this invention can be from about 0.0002 to about 0.01 weight percent based on the fuel. Expressed in different units these concentrations correspond respectively to about 0.5 to about 25 pounds per thousand barrels of fuel. These concentrations are sufficient to inhibit the deterioration which would occur in the absence of the compounds of this invention.

In formulating finished fuels it is common practice to employ concentrated gasoline solutions of the additives. These stock solutions are then cut with or metered into the remainder of the gasoline to achieve the appropriate concentration in the finished fuel. A feature of this invention is that such concentrated stock solutions are likewise very effectively stabilized by the presence therein of the above compounds of this invention. Consequently, the concentrations of the above ingredients can be as much as 10 times as high as those set forth above. The choice of concentrations is within the discretion of the refiner and takes into consideration the quantities of gasoline being processed, the storage temperatures to be accounted, the length of storage involved, etc. The specific concentrations given above are for illustrative purposes only and are not to be considered as limitations upon this invention.

Another embodiment of this invention is an antiknock fluid composition adopted for use as an additive to gasoline, which composition consist essentially of an organolead antiknock agent, a cyclopentadienyl manganese tricarbonyl or cyclopentadienyl nickel nitrosyl and a compound of this invention as defined above, there being present in the composition from about 0.00078 to about 30 parts by weight of manganese or nickel per part of lead and from about 0.001 to about 5 weight percent of the compounds of this invention based on the weight of the organolead antiknock agent. These compositions possess greater stability by virtue of the presence therein of a compound of this invention. Furthermore, these compositions provide an excellent vehicle by which the finished fuels of this invention can be formulated.

The foregoing compositions of this invention can also contain other additives known in the art. Halogen scavengers for the organolead antiknock agents (ethylene dibromide and/or ethylene dichloride, etc.), corrective agents (phosphorus, arsenic and antimony compounds, etc.), dyes, solvents and/or diluents are illustrative of the types of additives which can be co-present.

The following examples illustrate the compositions of this invention and the methods by which they are prepared.

*Example 38*

To 1000 gallons of a commercial gasoline having a gravity of 59.0° API, an initial boiling point of 98° F. and a final boiling point of 390° F. are added 3.18 grams per gallon of lead as tetraethyllead, 0.6 theory (based on the lead) of bromine as ethylene dibromide, 1.0 theory (based on the lead) of chlorine as ethylene dichloride, 0.25 gram of manganese per gallon as methylcyclopentadienyl manganese tricarbonyl and 0.0002 weight percent (based on the gasoline) of $\alpha^2,\alpha^6$-bis(3,5-di-tert-butyl-4-hydroxyphenyl)-4-n-nonyl-2,6-xylenol. The resultant fuel possesses enhanced stability characteristics.

*Example 39*

With a gasoline having an initial boiling point of 93° F., a final boiling point of 378° F., and API gravity of 56.2° and a tetraethyllead content equivalent to 0.2 gram of lead per gallon are blended cyclopentadienyl nickel nitrosyl to a concentration of 0.05 gram of nickel per gallon and $\alpha^2,\alpha^6$-bis(3-sec-butyl-5-n-hexy-4-hydroxyphenyl)-4-ethyl-2,6-xylenol to a concentration of 0.005 weight percent (based on the gasoline). The finished fuel so formed possesses improved stability properties.

*Example 40*

To a gasoline having an API gravity of 51.5° an initial boiling point of 91° F. and a final boiling point of 394° F. are blended 6.4 grams of lead per gallon as tetrabutyllead, 2 grams of manganese per gallon as octylcyclopentadienyl manganese tricarbonyl and 0.0008 weight percent (based on the gasoline of $\alpha^2,\alpha^6$-bis(3,5-di-n-dodecyl-4-hydroxypenyl)-4-tert-butyl-2,6-xylenol. The resultant fuel possesses very good stability.

*Example 41*

With a gasoline having an initial boiling point of 93° F. and a final boiling point of 410° F. are blended 2 grams of lead per gallon as tetraphenyllead, 6 grams of nickel as diethylcyclopentadienyl nickel nitrosyl, 1 theory (based on the lead) of bromine as ethylene dibromide and 0.01 weight percent (based on the gasoline) of $\alpha^2,\alpha^6$-bis-[3-($\alpha$-methylbenzyl)-5-($\alpha$-ethyl-$\alpha$-methylbenzyl)-4-hydroxyphenyl]-mesitol. The finished fuel has very good storage stability.

This invention also extends to the use in the above compositions of manganese pentacarbonyl (i.e., dimanganese decacarbonyl).

The products of this invention are also very effective antioxidants for high molecular weight unsaturated hydrocarbon polymers, such as polybutadiene, methyl rubber, polybutene rubber, natural rubber, butyl rubber, GR–S rubber, GR–N rubber, piperylene rubber, dimethyl butadiene rubber and the like. Thus a preferred embodiment of the present invention is a rubber containing as an antioxidant therefor, a compound of this invention as defined above. Another part of this invention is the method of preserving rubber which comprises incorporating therein a compound of this invention as defined above. The stabilizer is incorporated into the rubber by milling, Banbury mixing, or similar process, or is emulsified and the emulsions added to the rubber latex before coagulation. In the various embodiments of this invention the stabilizer is used in small amounts, generally ranging from about 0.01 to about 5.0 percent, based on the rubber.

As used in the description and claims, the term "rubber" is employed in a generic sense to define a high molecular weight plastic material which possesses high extensibility under load coupled with the property of forcibly retracting to approximately its original size and shape after the load is removed. It is preferable that the rubber be a sulfur-vulcanizable rubber, such as India rubber, reclaimed rubber, balata, gutta-percha, rubbery conjugated diene polymers and copolymers exemplified by the butadiene-styrene (GR–S) and butadiene-acrylonitrile (GR–N or Paracril) rubbers and the like, although the invention is applicable to the stabilization of any rubber, high molecular weight organic material which is normally susceptible to deterioration in the presence of oxygen, air, or ozone. The nature of these rubbers is well known to those skilled in the art.

Among the definite advantages provided by this invention is that the present rubber compositions possess unusually great resistance against oxidative deterioration. Moreover, these compositions exhibit excellent non-staining and non-discoloration characteristics. Furthermore, the novel stabilizer is relatively inexpensive and easily prepared, and possesses the highly beneficial property of low volatility. As is well known, a highly desirable feature of a rubber antioxidant is that it have a low volatility so that it remains admixed with the rubber during vulcanization and related process steps.

The rubber compositions of the present invention are illustrated by the following specific examples wherein all parts and percentages are by weight.

*Example 42*

To illustrate the enhanced oxygen resistance of the rubber compositions of this invention and their excellent non-staining and non-discoloration characteristics, a light-colored stock is selected for test. This stock has the following composition:

| | Parts by wt. |
|---|---|
| Pale crepe rubber | 100.00 |
| Zinc oxide filler | 50.00 |
| Titanium dioxide | 25.00 |
| Stearic acid | 2.00 |
| Ultramarine blue | 0.12 |
| Sulphur | 3.00 |
| Mercaptobenzothiazole | 1.00 |
| | 181.12 |

To the above base formula is added one part by weight of $\alpha^2,\alpha^6$-bis(3-p-ethylcyclohexyl-5-cyclopentyl-4-hydroxyphenyl)-$\alpha^2,\alpha^6$-di-n-dodecyl-4-n-octyl-2,6-xylenol, and individual samples are cured for 20, 30, 45 and 60 minutes at 274° C. using perfectly clean molds with no mold lubricant. Another set of samples of the same base formula which do not contain an antioxidant are cured under the same conditions.

*Example 43*

To a synthetic rubber master batch comprising 100 parts of GR–S rubber having an average molecular weight of 60,000, 50 parts of mixed zinc propionate-stearate, 50 parts of carbon black, 5 parts of road tar, 2 parts of sulfur and 1.5 parts of mercaptobenzothiazole is incorporated 1.5 parts of $\alpha^2,\alpha^6$-bis(3,5-dibenzyl-4-hydroxyphenyl)-$\alpha^2,\alpha^6$-di-sec-butyl-4-n-heptyl-2,6-xylenol. This batch is then cured for 60 minutes at 45 p.s.i. of steam pressure.

*Example 44*

Natural rubber stock is compounded according to the following formula:

|   | Parts |
|---|---|
| Thick gristly crepe natural rubber | 100 |
| Wax | 2 |
| Ultramarine dye | 0.1 |
| Zinc oxide | 70 |
| Titanium dioxide | 20 |
| Sulfur | 3 |
| Stearic acid | 1.2 |
| $\alpha^2,\alpha^6$ - bis[3 - ($\alpha$ - ethylbenzyl) - 5 - ($\alpha,\alpha$ - diethylbenzyl) - 4 - hydroxyphenyl] - $\alpha^2,\alpha^6$ - diphenyl-4 - n - heptyl - 2,6 - xylenol | 1 |
| Benzothiazyl disulfide | 0.4 |
| Amine activator | 0.5 |

Thick stock is then vulcanized for 60 minutes at 280° F.

*Example 45*

A butadiene-acrylonitrile copolymer is produced from butadiene-1,3 and 32 percent of acrylonitrile. Two percent (based on the dry weight of the copolymer) of $\alpha^2,\alpha^6$-bis(3-p-n-amylbenzyl-5-o-methylcyclohexyl - 4 - hydroxyphenyl)-4-p-n-hexylphenyl2,6-xylenol is added as an emulsion in sodium oleate solution to the latex obtained from emulsion copolymerization of the monomers. The latex is coagulated with a pure grade of aluminum sulfate and the coagulum, after washing, is dried for 20 hours at 70° C.

Each of the above illustrated rubber compositions of this invention possesses greatly improved resistance against oxidative deterioration as compared with the corresponding rubber compositions which are devoid of an antioxidant. Moreover, the light-colored stocks of the above examples exhibit virtually no discoloration or staining characteristics even when subjected to severe weathering conditions and the like. The methods of formulating the improved rubber compositions of this invention will now be clearly apparent to those skilled in the art.

The amount of stabilizer employed in the rubber compositions of this invention varies from about 0.001 to about 5 percent by weight based on the weight of the rubber. The amount used depends somewhat upon the nature of the rubber being protected and the conditions of service to be encountered. Thus, in the stabilization of natural and synthetic rubber to be used in the manufacture of tires which are normally subjected to exposure to the elements, as well as to the action of sunlight, frictional heat, stress and the like, the use of relatively high concentrations of this inhibitor is advantageous. On the other hand, when the article of manufacture is not to be subjected to such severe conditions, relatively low concentrations can be successfully utilized. Generally speaking, amounts ranging from about 0.25 to about 2 percent by weight give uniformly satisfactory results.

Other rubbers and elastomers which can be prepared according to this invention are the rubbery polymerizates of isoprene, butadiene-1,3 piperylene; also the rubbery copolymer of conjugated dienes with one or more polymerizable monoolefinic compounds which have the capability of forming rubbery copolymers with butadiene-1,3, outstanding examples of such monoolefinic compounds being those having the group $CH_2=C<$, exemplified by styrene. Examples of such monoolefins are styrene, vinyl naphthalene, alpha methyl styrene, p-chlorostyrene, dichlorostyrene, acrylic acid, methyl acrylate, methyl methacrylate, methacrylonitrile, methacrylamide, methyl vinyl ether, methyl vinyl ketone, vinylidine chloride, vinyl carbazole, vinyl pyridines, alkyl substituted vinyl pyridines, etc. In fact, excellent stabilization is achieved by incorporating a compound of this invention in any of the well known elastomers which are normally susceptible to deterioration in the presence of air, such as elastoprenes, elastolenes, elastothiomers, and elastoplastics.

I claim:
1. A compound having the formula:

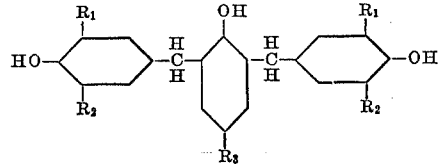

wherein $R_3$ is an alkyl group of from 1–8 carbon atoms and $R_1$ and $R_2$ are each individually selected alpha-branched alkyl groups of from 3–12 carbon atoms.

2. A di(3,5-dialkyl-4-hydroxybenzyl)phenol wherein each of the alkyl radicals has up to eight carbon atoms and each of said alkyl groups on each benzyl nucleus is branched on the alpha carbon atom and wherein each 3,5-dialkyl-4-hydroxybenzoyl group is attached to one of the ring carbon atoms ortho to the phenolic hydroxyl.

3. The polynuclear phenol comprising one mononuclear aryl ring, said ring having one hydroxyl group, and two 3,5-dialkyl-4-hydroxylbenzyl groups, wherein each alkyl group has up to eight carbon atoms and is branched on the alpha carbon atom, said polynuclear phenol having three six-membered nuclei in the molecule and having a phenolic group on each nucleus, and each 3,5-dialkyl-4-hydroxylbenzyl group being attached to a ring carbon atom on said aryl nucleus which is one of the ring carbon atoms ortho to the hydroxyl group.

4. The process for preparing the compounds of claim 1 which comprises reacting a benzyl halide having the formula

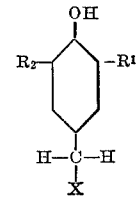

wherein $R_1$ and $R_2$ are each individually selected alpha-branched alkyl groups of from 3–12 carbon atoms and X is halogen with a para-substituted phenol having the formula

wherein $R_3$ is an alkyl group of from 1–8 carbon atoms.

5. $\alpha^2,\alpha^6$-Bis(3,5-di-tert-butyl-4-hydroxyphenyl)mesitol.

6. The process of claim 4 wherein X is chlorine.

7. The process of claim 6 wherein said para-substituted phenol is p-cresol, and said benzyl halide is 3,5-di-tert-butyl-4-hydroxybenzyl chloride.

8. $a^2,a^6$-Bis(3,5 - di - tert - butyl - 4 - hydroxyphenyl)-4-tert-octyl-2,6-xylenol.

9. The process of claim 6 wherein said para-substituted phenol is p-tert-octylphenol and said benzyl halide is 3,5-di-tert-butyl-4-hydroxybenzyl chloride.

10. Organic material normally tending to undergo oxidative deterioration containing a small antioxidant quantity, up to 5 percent, of the compound of claim 1.

11. The composition of claim 10 wherein said organic material is a lubricating oil.

12. The composition of claim 10 wherein said organic material is a saturated hydrocarbbon synthetic polymer.

13. Organic material normally tending to undergo oxidative deterioration containing a small antioxidant quantity, up to 5 percent of $\alpha^2,\alpha^6$-bis(3,5-di-tert-butyl-4-hydroxyphenyl)mesitol.

14. The composition of claim 13 wherein said organic material is rubber.

15. The composition of claim 13 wherein said organic material is gasoline.

16. The composition of claim 13 wherein said organic material is antiknock fluid.

17. The stabilized composition consisting essentially of a polymerized alpha olefin containing an amount of a mononuclear monohydroxy polynuclear phenol having two 3,5-di-alkyl-4-hydroxybenzyl substituents, each of said of the alkyl radicals on each benzyl nucleus being branched on the alpha carbon atom, said polynuclear phenol having three six-membered nuclei in the molecule and having a phenolic hydroxy group on each nucleus in amount sufficient to stabilize the composition against oxidative deterioration.

18. The stabilized composition consisting essentially of a hydrocarbon material normally subject to oxidative deterioration and containing the polynuclear phenol comprising one mononuclear aryl ring, said ring having one hydroxyl group and two 3,5-dialkyl-4-hydroxybenzyl substituents wherein each of the alkyl radicals has up to eight carbon atoms and each of said alkyl radicals on each benzyl nucleus is branched on the alpha carbon atom, said polynuclear phenol having three six-membered nuclei in the molecule and having a phenolic hydroxyl group on each nucleus, and each of said 3,5-dialkyl-4-hydroxybenzyl groups being attached to one of the ring carbon atoms ortho to the hydroxyl group in amount sufficient to stabilize the composition against oxidative deterioration.

References Cited by the Examiner

UNITED STATES PATENTS

| | | | |
|---|---|---|---|
| 2,669,588 | 2/1954 | Deming et al. | 260—619 |
| 2,719,866 | 10/1955 | Gerzon | 260—619 |
| 2,732,406 | 1/1956 | Lambert | 260—619 |
| 2,830,025 | 4/1958 | Knowles et al. | 252—52 |
| 2,841,627 | 7/1958 | Beaver | 260—619 |
| 2,954,345 | 9/1960 | Filbey | 252—52 |
| 3,053,803 | 9/1962 | Jaffe et al. | 260—619 |

FOREIGN PATENTS 1,263,155  7/1960  France.

OTHER REFERENCES

Shell International, etc., 63,000–60, filed July 28, 1960 (Australian Abstract) Open to Public Inspection Feb. 2, 1961 (1 page).

LEON J. BERCOVITZ, *Primary Examiner.*

JULIUS GREENWALD, H. G. MOORE, *Examiners.*

P. C. BAKER, H. E. TAYLOR, *Assistant Examiners.*